United States Patent [19]

Nembach

[11] 3,864,991
[45] Feb. 11, 1975

[54] FLUID PRESSURE CONTROL SYSTEM FOR A COMPOUND TRANSMISSION COMPRISING AN ADJUSTABLE HYDROSTATIC TRANSMISSION PART AND A SECONDARY MECHANICAL LOAD CHANGE-OVER TRANSMISSION

[75] Inventor: Siegfried Nembach, Neu-Ulm, Germany

[73] Assignee: Hydromatik GmbH, Ulm, Danube, Germany

[22] Filed: July 23, 1973

[21] Appl. No.: 382,044

[30] Foreign Application Priority Data
July 31, 1972 Germany............................ 2237595

[52] U.S. Cl...................... 74/687, 74/645, 74/868, 74/878
[51] Int. Cl. ................................. F16h 47/04, B60k
[58] Field of Search ............ 74/645, 687, 730, 732, 74/733, 740, 752 C, 857, 865, 868, 878

[56] References Cited
UNITED STATES PATENTS

| | | |
|---|---|---|
| 3,283,612 | 11/1966 | Densham .............................. 74/687 |
| 3,286,541 | 11/1966 | Dearnley et al. ................. 74/687 X |
| 3,300,000 | 1/1967 | Stoyke .................... 74/687 |
| 3,302,487 | 2/1967 | Kempson ......................... 74/687 X |
| 3,406,597 | 10/1968 | De Brie Perry et al............... 74/865 |
| 3,442,153 | 5/1969 | Ross.................................. 74/868 X |
| 3,455,184 | 7/1969 | Frandsen et al. ..................... 74/687 |
| 3,733,931 | 5/1973 | Nymann et al. .................. 74/687 X |
| R27,307 | 3/1972 | DeLalio .............................. 74/687 |

*Primary Examiner*—Samuel Scott
*Assistant Examiner*—Lance W. Chandler
*Attorney, Agent, or Firm*—Owen, Wickersham & Erickson

[57] ABSTRACT

A control for a compound transmission comprising an adjustable hydrostatic transmission part and a secondary mechanical load change-over transmission adjusts the hydrostatic transmission part simultaneously with the shifting of the load change-over transmission part.

3 Claims, 1 Drawing Figure

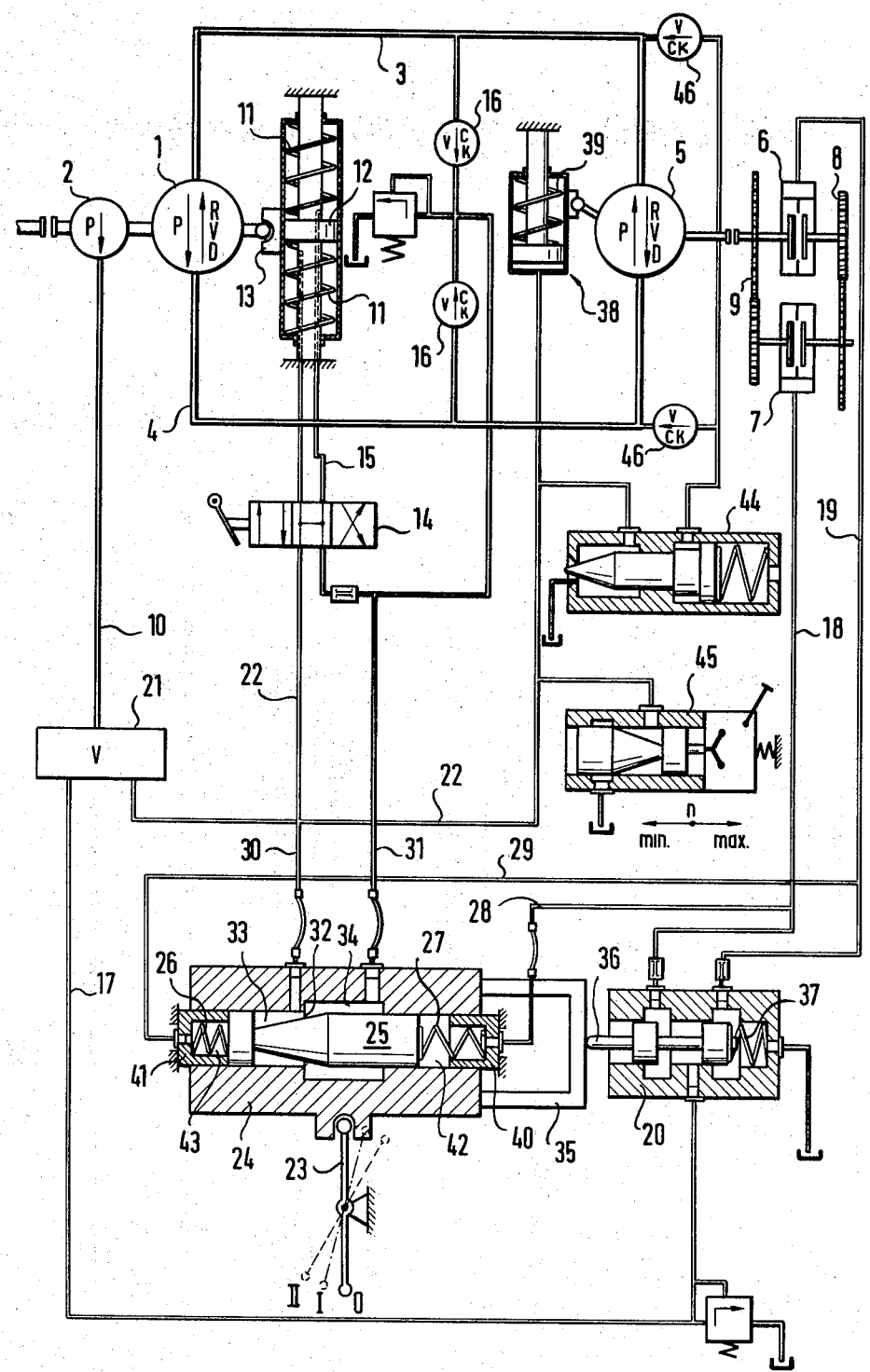

FLUID PRESSURE CONTROL SYSTEM FOR A COMPOUND TRANSMISSION COMPRISING AN ADJUSTABLE DYDROSTATIC TRANSMISSION PART AND A SECONDARY MECHANICAL LOAD CHANGE-OVER TRANSMISSION

BACKGROUND OF THE INVENTION

The invention relates to a control device for a compound transmission comprising an adjustable hydrostatic transmission part and a secondary mechanical load change-over transmission, the pump and/or hydromotor of the hydrostatic transmission part being adjusted by an adjustment member or members by means of oil pressure which is varied by a control device, and the clutch of the load change-over transmission being actuated against spring tension by means of oil pressure controlled by a control member, and the adjustment of the displacement volume of the pump and/or of the hydromotor during a shift in the load change-over transmission being altered at a reverse ratio to the transmission jump caused by the gear change in the load change-over transmission.

In a number of applications, the scope of regulation of hydrostatic transmissions is insufficient even in the case of primary (pump) and secondary (motor) adjustment. To increase the range of adjustment of transmissions, it is possible to combine the hydrostatic transmission with a superimposed mechanical/hydrostatic transmission in series with a mechanical gear shift, or with a load change-over transmission. Superimposed transmissions are expensive to manufacture. Mechanical gear shifts can only be shifted at a standstill when the changes in transmission are great and require a clutch that can be thrown out. Load change-over transmissions may be shifted during the run, but they cause a shock whose magnitude is a function of the change in transmission.

To avoid shift shocks, it is known (laid-open German application 1,555,247) to control a hydrostatic transmission with two motors with the aid of a servo-reinforced actuating lever via cam plates, and thus to control a hydraulic clutch as a function of the adjustment of one of the motors, said clutch coupling the one motor with the driven shaft. The other motor is connected directly to the driven shaft. Shift shocks are avoided because it is posssible to traverse the range of adjustment of the hydrostatic transmission more than once. By coupling the other motor to the driven shaft, the transmission ratio of the hydrostatic transmission is reset simultaneously, and only thereafter accelerated anew. There is the disadvantage that all control and shift phases must be actuated by complicated mechanical members (cam plates) and that a rigid correlation obtains between shift position of the clutch and transmission adjustments which cannot be influenced by possible additional overload action, for example, maximum load regulation.

It is further known (laid-open German application 2,053,698) to influence a control circuit with the aid of an actuating lever so that, first, the control pump is deviated and then, when the control pressure has reached a predetermined magniturde, a hydraulic actuating device which is triggered by said pressure trips a valve which, by auxiliary pressure, actuates the clutch of a series transmission. This device does not allow traversing of the pump adjustment range more than once. Neither is there a provision for resetting the pump in connection with the shifting operation, for avoiding shift shocks.

It is known in connection with hydrostatic/mechanic compound transmissions of another type (German published application 1,750,503, laid-open German appplication 1,817,764) to have the oil prressure of clutches act upon the steering gear for adjusting the displacement volume of a hydrostatic transmission part. However, what is involved here are transmissions with which it is possible, by shifting the clutch, to obtain either purely hydrostatic operation or hydrostatic/mechanic operation with power branching. The clutches are reversed when, in the purely hydraulic operation, the hydrostatic transmission has achieved its maximum starting speed, the clutch reversal into the hydrostatic/mechanical range being actuated when the speed of the engaging clutch halves is identical.

SUMMARY OF THE INVENTION

The underlying object of the invention is to improve a control device for transmissions of the type descrived in the above introduction, in such a manner that, in addition to avoiding shift shock, the possibility of an override of the hydrostatic transmission is preserved, for example by maximum load regulation, maximum pressure regulation, or the like.

In accordance with the invention, this problem is solved by providing a means for also feeding the shift oil pressure to the control device for the displacement volume adjustment. The control device is in the form of a throttle slide adjustable from the outside and comprising two parts which are movable in relation to each other for adjusting the oil pressure. One of the movable parts delimits two pressure chambers each of which is connected with one of the oil conduits of the clutches. When one of the pressure chambers is supplied with pressure, the corresponding movable portion of the throttle slide is displaced against a corresponding abutment which determines its starting position for displacement volume adjustment. As a result, the control device of the hydrostatic transmission is adjusted to a different control range simultaneously with the shifting of the load change-over transmission; in such a control range, the pump and/or motor may be adjusted, jointly or in succession, from the smallest transmission ratio to the largest transmission ratio of the hydrostatic transmission. The shift shock is avoided since, when the highest transmission ratio of the hydrostatic transmission is reached and the load change-over transmission is shifted, the hydrostatic transmission is set back to a lower transmission ratio by altering the starting position of the control device for the hydrostatic transmission. Over-ridability of the hydrostatic transmission is preserved, since each shift phase of the load change-over transmission is afforded the full range of displacement volume adjustment of the hydrostatic transmission, and override of the hydrostatic transmission is made possible within this range in known manner, without influencing the load change-over transmission.

Practical embodiments of the invention are offered by specific features described in greater detail below with reference to the drawing. If the other displaceable part of the throttle slide is coupled with the shift member of the load change-over transmission, then it is possible to shift the entire compound transmission up and down without shift shock by moving only one single manual lever.

It is already known from prior art (laid-open German application 2,126,230) to adjust the displacement volume change of a hydromotor by a control device in the form of a throttle slide. In accordance with the present invention, the throttle side has an outer sleeve which is moved by the adjusting member, the inner slide being movable and receiving oil pressure at its ends. The effect of the known control device is not comparable with the effect which is produced by the present invention.

BRIEF DESCRIPTION OF THE DRAWING

FIG. 1 shows schematically a compound transmission comprising an adjustable hydrostatic transmisssion part and a secondary mechanical load change-over transmission with a corresponding adjusting device constructed in accordance with one embodiment of the invention.

DESCRIPTION OF THE PREFERRED EMBODIMENTS

A driving machine, not shown, drives an adjusting pump 1 and a control oil pump 2. The pump 1 is connected to an adjusting motor 5 via conduits 3, 4. Pump 1 and motor 5 are, for example, axial piston machines and form the hydrostatic transmission. A mechanical load change-over transmission comprising shift steps 8 and 9 is arranged in series therewith via hydraulically actuated couplings 6, 7. The control oil pump 2 feeds, through conduits 10, 22, the piston 12 which is centered by springs 11 of an adjustment member 13 of the pump 1, depending on the position of a valve 14 on one or on the other side. The cylinder chamber of the adjusting member 13 on the side of the piston 12 which is not being oil-fed is connected, via a conduit 15 and one of the check valves 16, with the low pressure carrying conduit 3 or 4 of the hydrostatic transmission. Also, the adjusting member 38 of the motor 5 is connected with the control oil pump 2 via the conduit 22. The springs 39 and 11 of the adjusting members 38 and 13, respectively, of the motor 5 and of the pump 1 of the hydrostatic transmission are so attuned with the effective piston surfaces that at first the pump 1 is adjusted (primary adjustment) and, only after reaching its full angle of traverse, the motor 5 is adjusted (secondary adjustment). Further, the oil pump 2 is connected, via a volume graduation device 21 and a conduit 17 and shift coil conduits 18, 19, with one of the two couplings 6 or 7 or with both couplings 6 and 7, as a function of a distance slide 20 forming the shift member of the load-changeover clutch.

The control device for the hydrostatic transmission is in the form of a throttle slide and comprises a housing portion 24 displaceable by a manual lever 23, and in which a throttle piston 25 is freely movable. Both sides of the piston 25 are loaded by centering springs 26, 27 and form, together with fixed abutments 40, 41, pressure chambers 42, 43 connected with the oil conduits 18, 19 via conduits 28, 29. The conduits 22 and 15 are connected by conduits 30 and 31, respectively, with the control chambers 33 and 34, respectively, disposed in advance and in back of the throttle cross-section 32. The housing portion 24 is connected to the slide piston 36 of the valve 20 via a lug 35, the connection being positively maintained by a spring 37.

To create the possibility of an override for avoiding overloading, a maximal pressure limiting valve 44 and a control valve 45 influenced by the speed of the driving machine (not shown) of the pump 1 are connected to the oil conduit 22. The maximal pressure limiting valve 44 is connected, via check valves 46, to the conduit 3 or 4 with the higher operating pressure of the hydrostatic transmission.

The control device works as follows:

The driving machine (not shown) drives the adjusting pump 1, which is maintained in O-position by the springs 11, and the oil control pump 2. The latter conveys a part of the control oil via the conduits 10, 22, 30, the chambers 33, 34 and the conduits 31, 15 and one of the check valves 16, into one of the conduits 3 or 4. The other part of the oil, which has been branched off by the volume dividing device 21, flows through the conduit 17 and the valve 20 into the oil conduits 18 to the coupling 7 and through the conduit 28 into the pressure chamber 42 of the throttle piston 25. For one, the coupling 7 is thereby disengaged and, further, the throttle piston 25 is moved to the left against the abutment 41, and a throttling effect on the cross-section 32 does not occur at this time. Now, when the manual lever 23, which until now has been in O-position, is moved in direction toward the position 1, the housing part 24 is displaced to the right, whereby the cross-section 32 is narrowed, causing oil pressure build-up in the control chamber 33 which impinges on the adjusting member 13 of the pump 1 depending on the position of the distance valve 14, so that the pump 1 swings out in the desired direction (that is, the direction of rotation of the hydrostatic transmission and of the load change-over transmission). Simultaneously, the slide piston 36 is moved continuously along to the right via the lug 35, until it relieves the oil conduit 18, and the conduit 19 is charged with oil, whereby the coupling 7 is closed and the coupling 8 disengaged (changing the load change-over transmission over to a different stage). The swinging-out action of the pump 1 and of the motor 2, and the clutch shifting action are so attuned to each other that shifting of the load change-over transmission occurs only when the pump 1 swings out fully and the motor 2 is swung back to the narrowest angle (largest transmission ratio of the hydrostatic transmission).

Simultaneously with the shifting of the load change-over transmission, the pressure chamber 42 of the throttle piston 25 which hitherto was loaded through the conduit 28 is relieved, and the pressure chamber 43 is charged with oil pressure through the conduit 29, so that the throttle piston 25 moves to the right against the abutment 40 into a new starting position. The throttle cross-section 32 is thereby enlarged so that, as a result of the diminished oil pressure, the pump 1 is swung back and the motor 2 is swung out.

If in this new starting position of the hydrostatic transmission the manual lever 23 is moved further to the left, in the direction of position II, the hydrostatic transmission is again accelerated, as described in connection with the movement of the lever 23 from O-position into position 1.

When the manual lever 23 is swung back from the position II in the direction of O-position, all above described events are triggered in reversed succession, the hydrostatic transmission being at first set back in its transmission ratio and being immediately accelerated again when the load change-over transmission is shifted, and then again set back with the aid of the manual lever 23.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

1. A control for a compound transmission of the kind comprising an adjustable hydrostatic transmission part and a secondary mechanical load changeover gear part, and in which the pump and/or the hydromotor of the hydrostatic transmission part is adjusted by a displacement volume adjusting member by means of a control oil pressure which is variable by the control, and the control clutches of the load changeover transmission part are actuated against spring forces by means of a shift control unit with shift oil pressure which can be turned on or off, and the control comprises an adjustable throttle point for adjusting the control oil pressure, said control comprising, a shift control unit having a slide piston moveable within the shift control unit to control the flow of the shift oil to the control clutches of the mechanical load changeover gear part, shift oil conduits for conducting oil from the shift control unit to the control clutches, a throttle slide control unit having, two fixed abutments, first and second moveable members which are moveable relative to each other and in relation to the two fixed abutments and which are effective to form an adjustable throttle point between the two members.

the first moveable member delimiting two pressure chambers in coaction with the two fixed abutments, each pressure chamber being connected with one of the shift oil conduits of the control clutches for the load change-over gear, and wherein, when one of the pressure chambers is supplied with pressure, said first moveable member abuts against one of the fixed abutments to determine its starting position in the adjustable throttle point for subsequent adjustment of the control oil pressure which determines the displacement volume of the hydrostatic transmission part, and wherein the second moveable member is adjustable from the outside and is coupled with the slide piston of the shift control unit for the control clutches so that adjustment of the second moveable member to displace the slide piston and produce a speed shift of the mechanical gear part simultaneously adjusts the throttle point to vary the displacement of the hydrostatic transmission part in reverse ratio to the transmission jump caused by the mechanical gear shift.

2. The invention defined in claim 1 wherein the control oil and the shifting oil are supplied by a common pump and are fed via a volume divider to the control device and to the shifting device.

3. The invention defined in claim 1 wherein the moveable members of the throttle slide control unit include a manually adjustable housing and a throttle piston moveable in the housing between the two fixed abutments and wherein the pressure chambers which are supplied with the shift oil pressure are provided between the fixed abutments and the throttle piston.

* * * * *